United States Patent [19]

Anthony

[11] Patent Number: 5,076,000

[45] Date of Patent: Dec. 31, 1991

[54] WEEDLESS, TURTLE EXCLUSION DEVICE

[76] Inventor: Earnest Anthony, 31248 Carolyn La., Lacombe, La. 70445

[21] Appl. No.: 462,141

[22] Filed: Jan. 8, 1990

[51] Int. Cl.$^5$ ............................................. A01K 73/02
[52] U.S. Cl. ...................................................... 43/9.2
[58] Field of Search .................. 43/9.2, 100, 101, 104, 43/9.1

[56] References Cited

U.S. PATENT DOCUMENTS

| 1,447,553 | 3/1923 | Hudson . | |
|---|---|---|---|
| 1,462,196 | 7/1923 | Dros . | |
| 1,745,251 | 1/1930 | Enright . | |
| 2,056,772 | 10/1936 | Dahl | 43/9 |
| 2,511,057 | 6/1950 | Guthrie et al. | 43/9 |
| 2,721,411 | 10/1955 | Pedersen | 43/9 |
| 2,890,543 | 6/1959 | Mitchell | 43/9 |
| 3,015,903 | 1/1962 | Willingham | 43/9 |
| 3,132,434 | 5/1964 | Luketa | 43/9 |
| 3,195,261 | 7/1966 | Luketa | 43/9 |
| 3,440,752 | 4/1969 | Minter | 43/6.5 |
| 3,849,927 | 11/1974 | Gonsalves | 43/14 |
| 4,006,549 | 2/1977 | Seabrooke | 43/14 |
| 4,043,068 | 8/1977 | Savoie | 43/9 |
| 4,174,582 | 11/1979 | McKnight | 43/14 |
| 4,193,219 | 3/1980 | Pogue | 43/14 |
| 4,351,127 | 9/1982 | Mitchell | 43/9 |
| 4,402,154 | 9/1983 | Pence | 43/9 |
| 4,611,424 | 9/1986 | Tarantino | 43/100 |
| 4,739,335 | 2/1988 | West et al. | 43/9 |
| 4,739,574 | 4/1988 | Saunders | 43/9 |

FOREIGN PATENT DOCUMENTS 77788 7/1893 Fed. Rep. of Germany ........ 43/101

OTHER PUBLICATIONS

U.S. National Atmospheric and Oceanic Administration; drawings.

Primary Examiner—Kurt Rowan
Attorney, Agent, or Firm—C. Emmett Pugh

[57] ABSTRACT

A weedless turtle exclusion device which excludes turtles and like sized things from trawl nets and the like, while allowing the desired catch therethrough. A deflector, through which the catch passes en route to the net's tail bag or codend is situated between optional spacer rings in the trawling net and comprises a circular frame angularly affixed to the internal walls of the net's chute. Situated at upstream connection points are parallel deflection bars, running from the upstream connection points toward the downstream side of the frame. The bars are spaced allowing passage of the desired catch, e.g., shrimp, while narrow enough to deflect the larger turtles. They are unconnected on their downstream side and angled about five to thirty-five (5-35) degrees relative to the frame, forming an opening between their downstream end and the frame. In operation (FIG. 4) the catch and turtles are directed into the trawl via a large mouth opening into the chute area. The catch passes unhindered while the larger turtles are deflected off of the angled deflection bars and through a trap door out of the net. Seaweed, etc., under the action of the water current, passes through the chute, coming into contact with the deflection bars and normally wrapping around them. Due to the bars' configuration the water current forces the seaweed to slide down and off them passing through the opening, freeing the seaweed from the deflector and preventing clogging.

12 Claims, 2 Drawing Sheets

WEEDLESS, TURTLE EXCLUSION DEVICE

BACKGROUND OF INVENTION

1. Field of Invention

The present invention relates to turtle exclusion marine systems used, for example, during trawling operations, and more particularly a new and unique weedless, turtle exclusion device (TED) designed to exclude turtles and similarly sized animals and things from trawl nets and the like in an underwater environment, while allowing the desired catch therethrough.

The improvement relates to a new and unique weedless design and operation, which not only prevents seaweed build up and clogging about the deflection area, but also prevents clogging due to the accumulation of, for example, plastic bags and comparable undesirable refuse about the deflector as well.

The present system as disclosed in the preferred exemplary embodiment comprises an inexpensive yet effective weedless, turtle exclusion, marine system, which effectively releases turtles and the like from the trawl, yet does not substantially decrease the yield of shrimp or other harvest. Further, the present system provides a turtle exclusion system which reduces the labor required in the trawling process, as the operator no longer needs to raise the trawl to remove weeds and other debris from the deflector panel as often, if at all, as the system is designed to effectively remove such debris.

2. Prior Art & General Background

As may be determined by a review of the below cited patents, the prior art has failed to teach an effective "weedless" turtle exclusion device.

The prior art teaches various devices designed for releasing a variety of marine life and things from a multitude of nets. A list of prior patents which may be of interest is presented below:

| Patent No. | Patentee(s) | Issue Date |
| --- | --- | --- |
| 1,447,553 | Hudson | 03/06/1923 |
| 1,462,196 | Dros | 07/17/1923 |
| 1,745,251 | Enright | 01/28/1930 |
| 2,056,772 | Dahl | 02/02/1934 |
| 2,511,057 | Guthrie et al | 06/13/1950 |
| 2,721,411 | Pedersen | 10/25/1955 |
| 2,890,543 | Mitchell | 06/16/1959 |
| 3,015,903 | Willingham | 01/09/1962 |
| 3,132,434 | Luketa | 05/12/1964 |
| 3,195,261 | Luketa | 07/20/1965 |
| 3,440,752 | Minter | 04/29/1969 |
| 3,849,927 | Gonsalves | 11/26/1974 |
| 4,006,549 | Seabrooke | 02/08/1977 |
| 4,043,068 | Savoie | 08/23/1977 |
| 4,174,582 | McKnight | 11/20/1979 |
| 4,193,219 | Pogue | 03/18/1980 |
| 4,351,127 | Mitchell | 09/28/1982 |
| 4,402,154 | Pence | 09/06/1983 |
| 4,611,424 | Tarantino | 09/16/1986 |
| 4,739,574 | Saunders | 04/26/1988 |
| 4,805,335 | West et al | 02/21/1989 |

As may be determined by a review of the above patents, the idea or concept regarding the "weedless" approach of turtle exclusion has not been expressed or otherwise taught in the prior art.

For example, U.S. Pat. No. 4,402,154 issued 1983 teaches a "Method and Apparatus for Classifying Marine Items" and teaches a device and method for separating shrimp and the like from trash and larger marine life, such as fish, turtles, etc. The device contemplates a baffle system including a plurality of parallel bars forming a deflection surface for deflecting larger marine life out of the path of the trawl net. It is noted that the parallel bars (11) are joined to the frame on one side (down-stream) but left in an "exposed" fashion on the "upstream" end.

The configuration as disclosed in the '154 patent is not weedless and would not function as disclosed in the present invention. The deflection bar design is opposite that contemplated by the present invention, which teaches bars joined on the upstream side of the frame and unjoined relative to the downstream side of the frame. Further, the present invention contemplates angled deflection bars relative to the deflection frame, thereby encouraging seaweed and the like to slide down and off the bars into the trap area, thereby preventing clogging of the TED.

U.S. Pat. No. 4,739,574 issued 1988 to Saunders of Biloxi, Miss. teaches a TED comprising a plurality of framed deflector bars joined on both ends by a deflector frame and perpendicular harness system.

Again, this patent is distinguishable from the present invention, as the claims relate to the overall structure of the device, including a net support member perpendicularly affixed to the barrier frame system, and a first and second horizontal bracing member with hinge means. As configured and used, the '574 invention is not weedless as taught in the present invention.

U.S. Pat. No. 4,805,335 issued Feb. 21, 1989 entitled "Sorting Device for Trawl Nets" teaches a trawl system having a deflector gate mechanism for allowing larger, heavier marine life, such as crabs and the like, to escape, thereby increasing the yield of desirable catch in the trawl. Like the above prior art, this patent does not contemplate a weedless system and is distinguishable again in operation and use.

The marine environment where trawlers operate tends to be replete with seaweed, moss, marine plants, as well as plastic ice bags, plastic garbage bags and the like. With the prior art exclusion devices, a persistent problem related to the collection of these plants and plastic bags on the deflection surface of the excluder, blocking it and preventing passage of the desired catch.

This blockage problem required the laborious and frequent task of raising the exclusion device to remove the debris from the deflection surface, interrupting the trawl and resulting in increased effort and expenses in the trawling operation.

As a result of this and other factors, the commercial fishing industry has tended to be vehemently opposed to legislation requiring the implementation of turtle exclusion devices, arguing that such devices severely hinder their fishing operations and the devices are ineffective in providing unencumbering exclusion means.

3. General, Summary Discussion of the Invention

The present invention provides a weedless, turtle exclusion system overcoming these prior art problems by providing a system which is highly reliable, relatively economical and very cost effective.

Unlike the prior art, the present system is at least substantially non-clogging, allowing passage of marine vegetation, plastic bags and the like through the deflection area and into the tail bag or codend, where it can be removed and disposed of properly.

Thus, the present invention provides a weedless, turtle exclusion device which does not require the periodic removal of blocking materials, while providing effective turtle exclusion means. This system as disclosed is superior over the prior art teachings in that it is practical for use by small and large scale fishing operations alike, allowing the user to comply with federal legislation regarding turtle exclusion, while not interfering with his catch.

The present system as disclosed in the exemplary embodiment of the invention comprises a framed set of angled deflection bars in parallel relation to one another, of sufficient width and having a surface which encourages the sliding of the vegetation, plastic, or the like down the bars during the trawling operation and into the tail bag or codend. The bars are angled in downstream fashion relative to the trawl, and are unconnected on their downstream ends, allowing the debris to pass down the bars due to the water current passing therethrough, over and off the bars, effectively preventing clogging of the system.

The exemplary system is comprised of aluminum, but many different materials may be used to form the present system. For example, the deflection bars may be "TEFLON" (tm) coated to insure a sufficiently slick, friction eliminating surface to allow the clogging matter to easily slide down the bars.

Further, the deflection system itself may be constructed from various materials in a variety of acceptable configurations including artificial materials, such as, for example, plastics or carbon fiber material, and/or a metal, such as, for example, steel, aluminum, stainless steel, and/or any and all manmade materials.

It is thus an object of the present invention to provide a weedless exclusion system for excluding turtles and like marine life from a trawl.

It is another object of the present invention to provide a turtle exclusion device which is economical to make and practical to use, without effecting the size of the user's catch.

It is still another object of the present invention to provide a turtle exclusion device comprising a partially framed set of angled deflection bars, configured to allow the passage of catch, seaweed, marine plants and plastic bags therethrough.

It is still another object of the present invention to provide a substantially weedless and non-clogging turtle exclusion device which may be adapted for use with a variety of trawl net sizes and configurations.

It is still another object of the present invention to provide a turtle exclusion device which is economical to manufacture and use, and which may be constructed utilizing relatively inexpensive materials.

Lastly, it is an object of the present invention to provide a substantially weedless and non-clogging method of excluding turtles and the like from the tail bag or codend, allowing escape of the turtles from the trawl.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED, EXEMPLARY EMBODIMENT(S)

Figure 1:
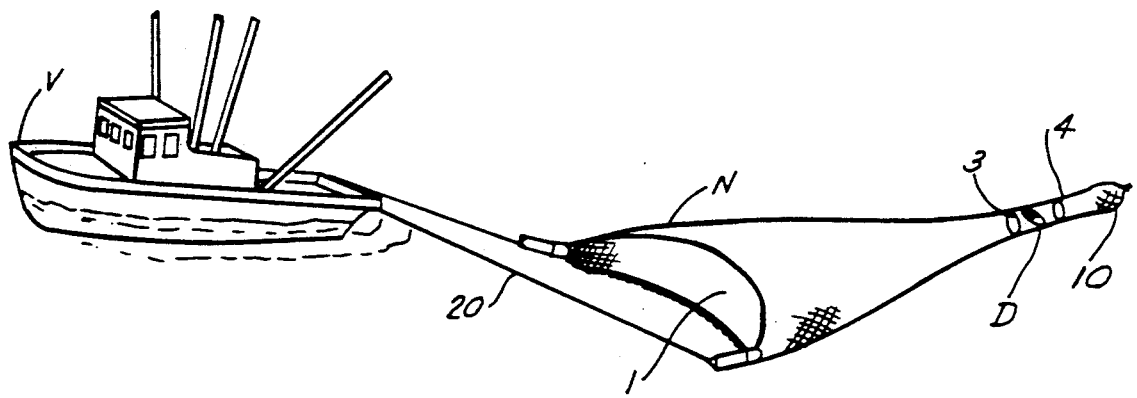
FIG. 1 a is side view of the preferred embodiment of the weedless, turtle exclusion system of the present invention, illustrating the placement of the weedless deflector relative to an exemplary trawl arrangement.

As can be seen in FIG. 1, the weedless, turtle exclusion system of the preferred, exemplary embodiment of the present invention may be implemented in conjunction with a standard trawl configuration, including a vessel V, a trawl net N and a weedless deflector D.

The trawl net N is affixed to and pulled through the water W by the vessel V via a trawl line 20. Trawl net N is of a generally infundibular configuration, forming a large opening, or mouth 1, through which the catch passes, narrowing to a chute 2. Spacer rings 3, 4 keep the chute 2 in an open position during slow trawls.

Situated between spacer rings 3, 4 is the weedless deflector D, through which the catch passes en route to the tail bag or codend 10.

As can be seen in the figures and is apparent from the foregoing, the deflection bars 6a–6e extend back to a position close to but spaced from the downstream end 17 of the frame, leaving a gap or opening 8 therebetween of a sufficient dimension to allow the passage of seaweed and plastic bags to slide off of the downstream ends of the deflection bars but small enough to prevent the passage of sea turtles, with the downstream ends of the deflection bars being free and unattached to one another. Hence, as can be further seen and understood from the foregoing, the deflection bars 6a–6e are smooth at least along their lengths and, with the absence of any cross-bars, also unimpeded along the length of the bars from the upstream end 16 of the frame to the downstream ends of the bars.

Figure 3:
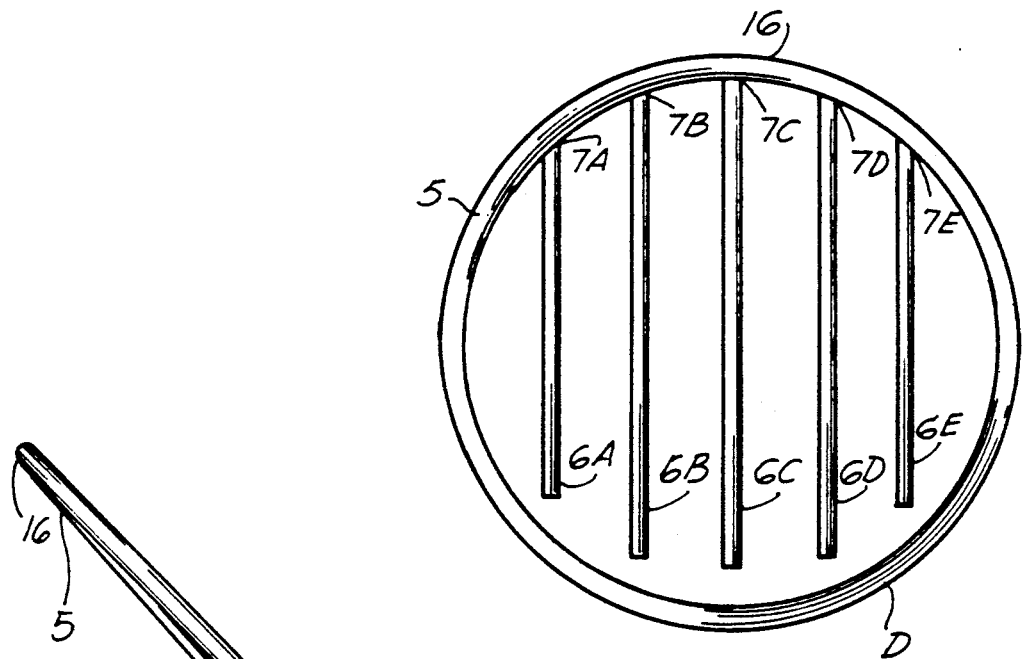
FIG. 3 is a frontal view of the weedless deflector of FIG. 1, illustrating the angulation of the deflection bars relative to the frame.
Figure 2:
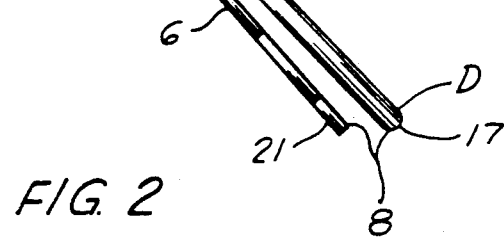
FIG. 2 is a side view of the weedless deflector of FIG. 1, illustrating the angulation of the deflection bars relative to the frame.

As shown in FIGS. 2 & 3, the exemplary deflector D of the present invention comprises a generally circular frame 5 configured to be angularly affixed to the internal walls of the chute 2.

As is well known, when the deflector is made of, for example, steel tube, aluminum or like metal, the deflector, including the frame and the deflector bars and their interconnection, will be rigid. Other configurations of the frame may be more suitable, depending upon the design of the trawl net.

The frame 5 is designed to have upstream 16 and downstream 17 ends, wherein the upstream end 16 forms the forward portion of the deflection means when implemented in chute 2.

Situated at upstream connection points 7a–7e are deflection bars 6a–6e. Deflection bars 6a–6e are situated in parallel fashion relative to one another, running from the upstream connection points 7a–7e generally toward the downstream side of the frame 17. Deflection bars 6a–6e are of sufficient spacing 18 to allow passage of the desired catch, for example, shrimp, while narrow enough to deflect the larger turtles and the like.

As shown in FIG. 2, deflection bars 6 are unconnected on their downstream side 21 and angled about five to thirty-five (5–35) degrees relative to the frame, forming an opening 8 between the downstream end of deflection bars 6 and the frame 17.

Figure 4:
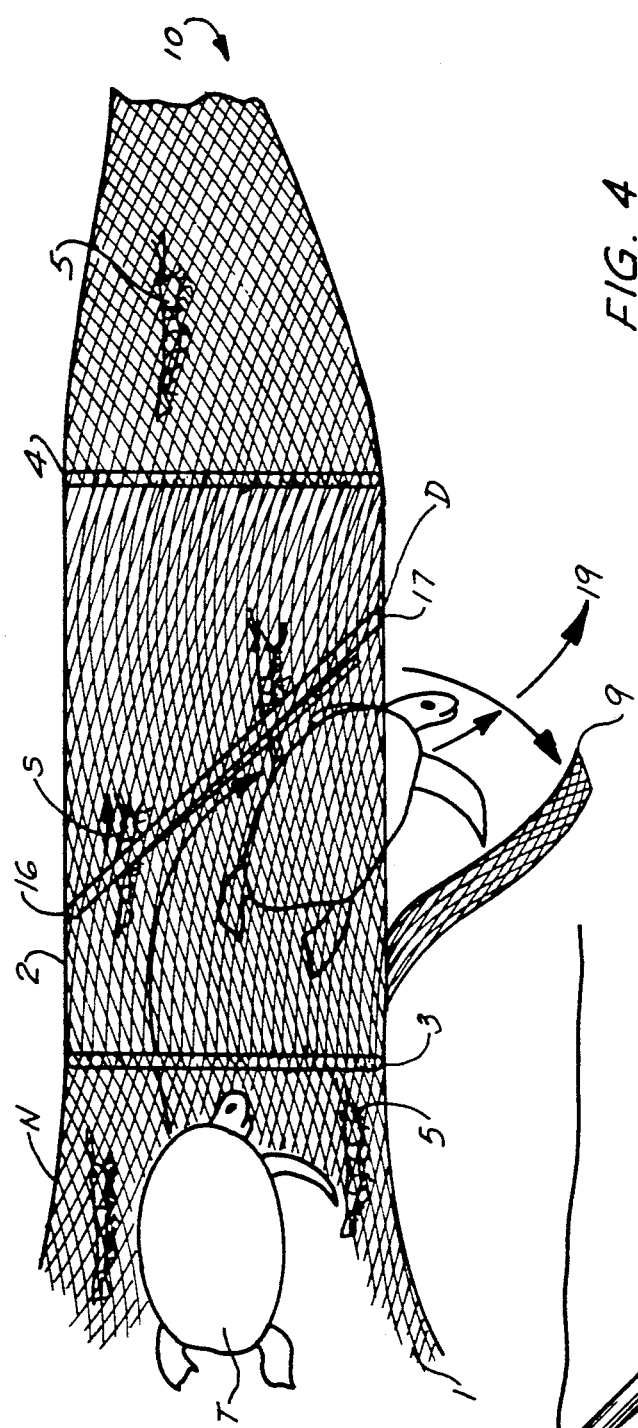
FIG. 4 is a side view of the weedless, turtle exclusion system of FIG. 1, illustrating in greater detail a turtle being deflected off of the weedless deflection bars and being directed through the escape hatch or exit hole.

In operation, as illustrated in FIG. 4, the catch S and turtles T ar directed into the trawl N via the large mouth opening 1 in the net to the chute 2 area, where, interspaced between the spacing rings 3,4, is angularly affixed the weedless deflector D.

As the deflection bars 6 are somewhat spaced apart, the catch S is allowed to pass unhindered through the deflector D into the tail bag or codend 10, while the larger turtles T (or similar sized objects) are deflected off of the angled deflection bars 6 and through a flap or trap door 9 out of the net 19.

Figure 5:
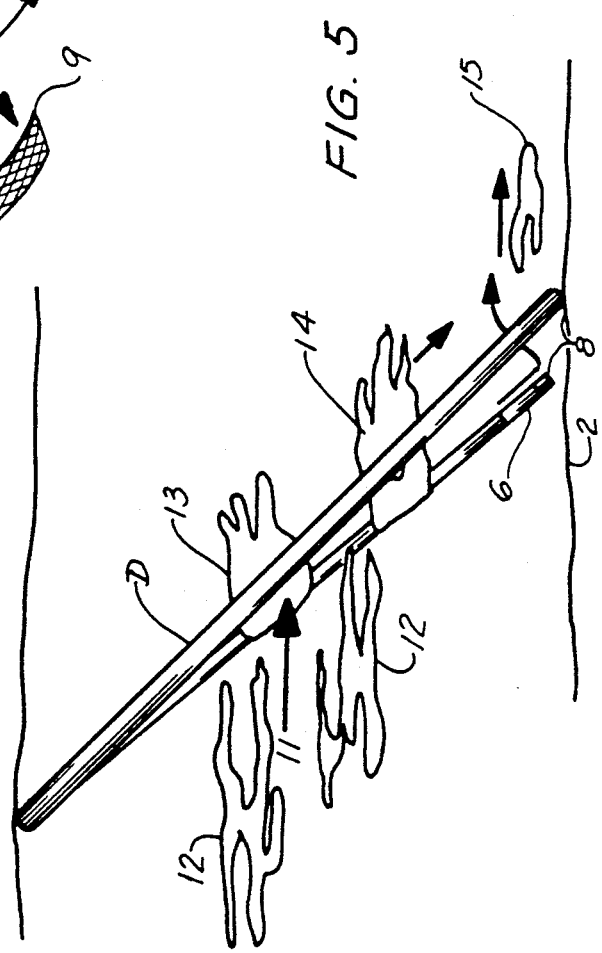
FIG. 5 is a side view of the deflector of FIG. 1, illustrating the weedless capability of the present system, showing seaweed or the like coming in contact with and being removed from the deflection bars.

The weedless operation of the present system is illustrated in FIG. 5, showing the weedless deflector D situated in chute 2 and having seaweed 12 or the like passing therethrough.

The seaweed or other debris 12 is directed through the chute area of the net via water current 11 or trawling action. As the seaweed or debris 12 passes through the chute 2, it comes into contact (note seaweed 13) with deflection bars 6 and will normally wrap around the bars.

In the prior art deflectors the seaweed or debris 12 would remain affixed to the bars, potentially clogging them and preventing the shrimp S or other catch from reaching the tail bag or codend 10. In the present invention, however, the deflection bars are configured to allow the water current 11 to apply pressure to the seaweed 13 on the bars 6, forcing the seaweed (note seaweed 14) to slide down the bars and off of their open downstream end 6, passing through opening 8, freeing the seaweed 15 from the deflector, thereby not clogging it.

The deflector of the present invention may, for example, be constructed of tube steel, aluminum, or like metal, or may be fabricated from plastic, carbon fiber, or any and all other natural or manmade material.

In order to facilitate the removal of the debris from the bars, the deflector may, for example, be coated with "TEFLON" (tm), chromium, or other like material.

The embodiment(s) described herein in detail for exemplary purposes are of course subject to many different variations in structure, design, application and methodology. Because many varying and different embodiments may be made within the scope of the inventive concept(s) herein taught, and because many modifications may be made in the embodiment(s) herein detailed in accordance with the descriptive requirements of the law, it is to be understood that the details herein are to be interpreted as illustrative and not in a limiting sense.

What is claimed is:

1. A weedless, turtle exclusion device for use in a trawl net which is used for catching a desired catch, such as shrimp or the like, in a water environment, which desired catch is smaller than seaturtles and which trawl net has a chute, comprising:
   a rigid frame having inside and outside edges, and an upstream end and a downstream end, and
   a plurality of rigid, spaced, deflection bars carried by said frame and being unimpeded along the length of said bars, said deflection bars being arranged in parallel fashion relative to one another but spaced apart a sufficient distance to allow the passage of the desired catch but preventing the passage of seaturtles, said deflection bars having upstream and downstream ends, said upstream ends of said deflection bars being rigidly affixed to said upstream end of said frame and angled toward the downstream direction away from said upstream end of said frame, said downstream ends of said deflection bars being unattached to said frame but extending to a position close to but spaced from said downstream end of said frame, leaving a gap between said downstream ends of said bars and said downstream edge of said frame of a sufficient dimension to allow the passage of seaweed and plastic bags to slide off of said downstream ends of said deflection bars but small enough to prevent the passage of sea turtles, with said downstream ends of said deflection bars being free and unattached to one another and said deflection bars being unimpeded along the length of said bars from said upstream end of said frame to the downstream ends of said bars, said deflection bars being configured to form a substantially planer deflection surface angled back up to a maximum of about thirty-five (35) degrees relative to said frame, the structure of said frame and said deflection bars and the gap between said downstream ends of said deflection bars and said downstream end of said frame allowing the device to be inserted within the chute of the trawl net closing off the downstream part of the chute to seaturtles from passing through the device but allowing the desired catch to pass through it, with seaweed and plastic bags which get initially caught on said deflection bars being slid along the length of the angled bars under the force of passing water until they slide off said downstream ends of said bars, reducing the clogging of the device with seaweed and plastic bags.

2. The weedless, turtle exclusion device of claim 1, wherein said deflection bars are coated with a friction eliminating material, such as "TEFLON" (tm).

3. The weedless, turtle exclusion device of claim 1, wherein said framing and said deflection bars are constructed of tubing material.

4. The weedless, turtle exclusion device of claim 3, wherein said device is composed of a metal, such as steel.

5. The weedless, turtle exclusion device of claim 3, wherein said device is composed of artificial material, such as plastic or carbon fiber composite.

6. The weedless, turtle exclusion device of claim 1, wherein said frame is mounted in angular fashion within a trawl net having a mouth, chute and tail bag or codend, said frame being mounted within said chute, with said upstream end of said frame being nearer said mouth than said downstream end of said frame, and said downstream end of said frame is nearer said tail bag or codend than said upstream end.

7. The weedless, turtle exclusion device of claim 1, wherein said planer deflection surface has an upstream end and a downstream end.

8. The weedless, turtle exclusion device of claim 7, wherein said downstream end of said planer deflection surface is sufficiently spaced relative to said downstream end of said frame to allow the passage of seaweed, plastic bags and like debris therethrough.

9. The weedless, turtle exclusion device of claim 8, wherein said deflection bars are sufficiently spaced relative to one another to allow the passage of catch therethrough, while being sufficiently narrow to allow the deflection of turtles and like sized objects.

10. The weedless, turtle exclusion device of claim 1, wherein the deflection bars are angled back at least about five degrees relative to said frame.

11. A method of preventing weeds and other debris from clogging turtle exclusion devices, comprising the following step(s):

i. providing a weedless, turtle exclusion deflector, comprising:

a rigid frame having inside and outside edges, and an upstream end and a downstream end, and a plurality of rigid, spaced, deflection bars, said deflection bars arranged in parallel fashion relative to one another but spaced apart a sufficient distance to allow the passage of the desired catch but preventing the passage of seaturtles, said deflection bars having upstream and downstream ends, said upstream ends of said deflection bars being rigidly affixed to said upstream end of said frame and angled toward the downstream direction away from said upstream end of said frame, said downstream ends of said deflection bars being unattached to said frame but extending to a position close to but spaced from said downstream end of said frame, leaving a gap between said downstream ends of said bars and said downstream edge of said frame of a sufficient dimension to allow the passage of seaweed and plastic bags to slide off of said downstream ends of said deflection bars but small enough to prevent the passage of sea turtles, with said downstream ends of said deflection bars being free and unattached to one another and said deflection bars being unimpeded along the length of said bars from said upstream end of said frame to the downstream ends of said bars, said deflection bars configured to form a somewhat planer deflection surface angled back up to a maximum of about thirty-five (35) degrees relative to said frame, the structure of said frame and said deflection bars and the gap between said downstream ends of said deflection bars and said downstream end of said frame allowing the device to be inserted within the chute of the trawl net closing off the downstream part of the chute to seaturtles from passing through the device but allowing the desired catch to pass through it, with seaweed and plastic bags which get initially caught on said deflection bars being slid along the length of the angled bars under the force of passing water until they slide off said downstream ends of said bars, reducing the clogging of the device with seaweed and plastic bags, said planer deflection surface comprising an upstream end and a downstream end, said downstream end of said planer deflection surface having sufficient space relative said to downstream end of said frame to allow the passage of seaweed, plastic bags, or like debris therethrough, said spacing of said deflection bars having sufficient space relative one another to allow the passage of catch therethrough, while being sufficiently narrow to allow the deflection of turtles;

ii. providing a trawl net comprising
a mouth;
a chute of lesser diameter than said mouth;
an escape port in said chute; and
a tail bag;

iii. mounting said deflector into said chute;

iv. trawling said net through water; and v. using said deflector to deflect turtles from said net through said escape port with seaweed being temporarily collected on said deflection bars, but thereafter having said collected seaweed slide back and off said deflection bars under the force of passing water, substantially preventing seaweed from clogging said deflector.

12. The method of preventing weeds and other debris from clogging turtle exclusion devices of claim 11, wherein the deflection bars are angled back at least about five degrees relative to said frame.

* * * * *